United States Patent
Ishikawa et al.

(10) Patent No.: US 7,561,389 B2
(45) Date of Patent: Jul. 14, 2009

(54) ALTERNATING-CURRENT VOLTAGE OUTPUT APPARATUS

(75) Inventors: Tetsuhiro Ishikawa, Nishikamo-gun (JP); Hichirosai Oyobe, Toyota (JP); Yukihiro Minezawa, Anjo (JP); Shigenori Togashi, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 166 days.

(21) Appl. No.: 11/660,084

(22) PCT Filed: May 2, 2006

(86) PCT No.: PCT/JP2006/309528
§ 371 (c)(1),
(2), (4) Date: Feb. 13, 2007

(87) PCT Pub. No.: WO2006/121142
PCT Pub. Date: Nov. 16, 2006

(65) Prior Publication Data
US 2007/0247770 A1 Oct. 25, 2007

(30) Foreign Application Priority Data
May 11, 2005 (JP) .............................. 2005-138496

(51) Int. Cl.
*H02H 3/00* (2006.01)
*H02H 9/08* (2006.01)
*F21V 7/04* (2006.01)
*H02M 7/48* (2007.01)

(52) U.S. Cl. .............................. 361/42; 361/31; 363/71

(58) Field of Classification Search ....................... None
See application file for complete search history.

(56) References Cited

U.S. PATENT DOCUMENTS

| 5,099,186 | A | | 3/1992 | Rippel et al. |
| 5,527,637 | A | * | 6/1996 | Nakazawa et al. ............ 429/99 |
| 6,049,185 | A | | 4/2000 | Ikeda |
| 6,097,107 | A | | 8/2000 | Ikeda |
| 6,970,807 | B2 | * | 11/2005 | Kito et al. .................... 702/183 |
| 7,109,681 | B2 | * | 9/2006 | Baker et al. .................. 318/801 |

(Continued)

FOREIGN PATENT DOCUMENTS

JP A 10-117445 5/1998

(Continued)

OTHER PUBLICATIONS

Sul et al., "An Integral Battery Charger for Four-Wheel Drive Electric Vehicle", IEEE Transactions on Industry Applications, vol. 31, No. 5, Sep. 1, 1995, pp. 1096-1099.

*Primary Examiner*—Albert W Paladini
*Assistant Examiner*—Dharti H Patel
(74) *Attorney, Agent, or Firm*—Oliff & Berridge, PLC (57) ABSTRACT

Inverters, based on signals from a control device, generate a commercial AC voltage across neutral points of 3-phase coils. A Y-capacitor for removing noise is connected to a load outside the vehicle receiving the supply of the commercial AC voltage. A relay connected in series with a leakage detecting device is provided inside the vehicle. The relay is turned off when a plug of the load outside the vehicle is connected to a connector, and prevents a leakage current from flowing via a ground.

10 Claims, 3 Drawing Sheets

U.S. PATENT DOCUMENTS

2003/0146726 A1    8/2003   Ishikawa et al.

FOREIGN PATENT DOCUMENTS

| JP | A 10-290529 | 10/1998 |
| JP | A 2002-218793 | 8/2002 |
| JP | A 2004-361309 | 12/2004 |
| WO | WO 2006/035959 A1 | 4/2006 |

* cited by examiner

ALTERNATING-CURRENT VOLTAGE OUTPUT APPARATUS

TECHNICAL FIELD

The present invention relates to an alternating-current (AC) voltage output apparatus, and particularly to an AC voltage output apparatus mounted to a vehicle and generating a commercial AC voltage to output it to a load outside the vehicle.

BACKGROUND ART

Japanese Pat. Laying-Open No. 10-290529 discloses an electric power unit mounted to an electric vehicle. The electric power unit includes a battery, an electric circuit system such as a running motor supplied with power from the battery and an on-vehicle auxiliary machine, an inverter circuit for generating a commercial AC voltage that converts a direct-current (DC) voltage from the battery to a commercial AC voltage for application to a commercial power supply load, a cutoff switch provided between the inverter circuit and the commercial power supply load, and a leakage detecting circuit that detects a ground-fault current leaking from the battery so as to detect leakage of the electric circuit system.

In this electric power unit, upon detection of the leakage, the leakage detecting circuit stops the inverter circuit and causes the cutoff switch to operate to cut off the power supply to the commercial power supply load, without interrupting the power supply to the electric circuit system such as the running motor and the on-vehicle auxiliary machine.

In the load receiving the supply of the commercial AC voltage, a line-bypass capacitor (also referred to as a "Y-condenser" or a "Y-capacitor") connected between a power line pair and a ground is sometimes provided, mainly for the purpose of removing noise.

In this case, if the electric power unit disclosed in Japanese Pat. Laying-Open No. 10-290529 is used to supply a commercial AC voltage to the load provided with such line-bypass capacitor, a ground on the side of the vehicle will be connected to a ground on the side of the load. This leads to a problem of a leakage current flowing from the load receiving the supply of the commercial AC voltage through the line-bypass capacitor, the ground and the leakage detecting circuit to a battery of the vehicle.

DISCLOSURE OF THE INVENTION

The present invention is directed to solve the above-described problem. An object of the present invention is to provide an AC voltage output apparatus for preventing a leakage current from flowing when the generated commercial AC voltage is supplied to a load outside the apparatus.

According to the present invention, the AC voltage output apparatus is mounted to a vehicle, and generates and supplies a commercial AC voltage to a load outside the vehicle. The AC voltage output apparatus includes a voltage generating device generating the commercial AC voltage, a first leakage detecting device arranged between the voltage generating device and a vehicle ground, and a cutoff device cutting off an electric path formed between the vehicle ground and the voltage generating device via the first leakage detecting device when the load is connected to the voltage generating device.

In the AC voltage output apparatus according to the present invention, the first leakage detecting device is provided between the voltage generating device for generating the commercial AC voltage and the vehicle ground. Thus, when the commercial AC voltage is supplied from the voltage generating device to the load, if the load is grounded, an electrical connection of the vehicle ground to the ground of the load may be established to cause a leakage current to flow from the load via the ground, the vehicle ground and the first leakage detecting device to the voltage generating device. In this AC voltage output apparatus, however, the cutoff device will cut off such leakage current.

Therefore, according to the AC voltage output apparatus of the present invention, it is possible to prevent the leakage current from flowing when the generated commercial AC voltage is supplied to the load outside the apparatus.

Preferably, the load includes a line-bypass capacitor connected between the ground and a power line pair receiving the supply of the commercial AC voltage.

In this AC voltage output apparatus, the line-bypass capacitor may reduce the influence of noise (common mode noise) on the load. However, since an electric path is formed between the load and the ground via the line-bypass capacitor, when the commercial AC voltage is supplied from the voltage generating device to the load, the leakage current may flow from the load via the line-bypass capacitor, the ground, the vehicle ground and the first leakage detecting device to the voltage generating device. In this AC voltage output apparatus, however, the cutoff device will cut off such leakage current.

Therefore, according to this AC voltage output apparatus, it is possible to reduce the influence of noise on the load and to prevent the leakage current from flowing when the generated commercial AC voltage is supplied to the load outside the apparatus.

Preferably, the voltage generating device includes a direct-current (DC) power supply. The cutoff device includes a relay connected in series with the first leakage detecting device between a negative electrode of the DC power supply and the vehicle ground. The relay is turned off when the load is connected to the voltage generating device.

In this AC voltage output apparatus, owing to the relay connected in series with the first leakage detecting device between the negative electrode of the DC power supply and the vehicle ground, the leakage current will be cut off that may flow when the commercial AC voltage is supplied from the voltage generating device to the load.

Therefore, according to this AC voltage output apparatus, it is possible to prevent the leakage current from flowing when the generated commercial AC voltage is supplied to the load outside the apparatus, with a simple configuration.

Preferably, the AC voltage output apparatus further includes a second leakage detecting device detecting whether there is leakage or not, based on an alternating current flowing through an output line pair for outputting the commercial AC voltage generated by the voltage generating device to the load.

In this AC voltage output apparatus, when the commercial AC voltage is supplied from the voltage generating device to the load, the cutoff device operates to disable the first leakage detecting device. However, the second leakage detecting device detects the leakage.

Therefore, according to this AC voltage output apparatus, it is possible to ensure a function of detecting leakage even at the time of the supply of the commercial AC voltage.

Preferably, the voltage generating device includes first and second AC electric motors having first and second 3-phase coils as a stator coil, respectively, first and second inverters connected to the first and second 3-phase coils, respectively, and an inverter control unit controlling the first and second inverters. The first and second inverters generate a commercial AC voltage across neutral points of the first and second 3-phase coils in response to a control signal from the inverter control unit.

In this AC voltage output apparatus, since the commercial AC voltage is generated across the neutral points of the first and second 3-phase coils, an inverter dedicated to generating the commercial AC voltage is unnecessary. When the commercial AC voltage generated across the neutral points of the first and second 3-phase coils is supplied to the load, a leakage current may flow from the load via the ground, the vehicle ground and the first leakage detecting device to the voltage generating device. However, in this AC voltage output apparatus, the cutoff device will cut off such leakage current.

Therefore, according to this AC voltage output apparatus, it is possible to implement an AC voltage output apparatus at low cost. In addition, it is also possible to prevent the leakage current from flowing when the generated commercial AC voltage is supplied to the load outside the apparatus.

As described above, according to the AC voltage output apparatus of the present invention, it is possible to prevent the leakage current from flowing when the generated commercial AC voltage is supplied to the load outside the apparatus.

BEST MODES FOR CARRYING OUT THE INVENTION

Embodiments of the present invention will be hereinafter described in detail with reference to the accompanying drawings, in which the same or corresponding components are designated by the same reference characters, and description thereof will not be repeated.

Figure 1:
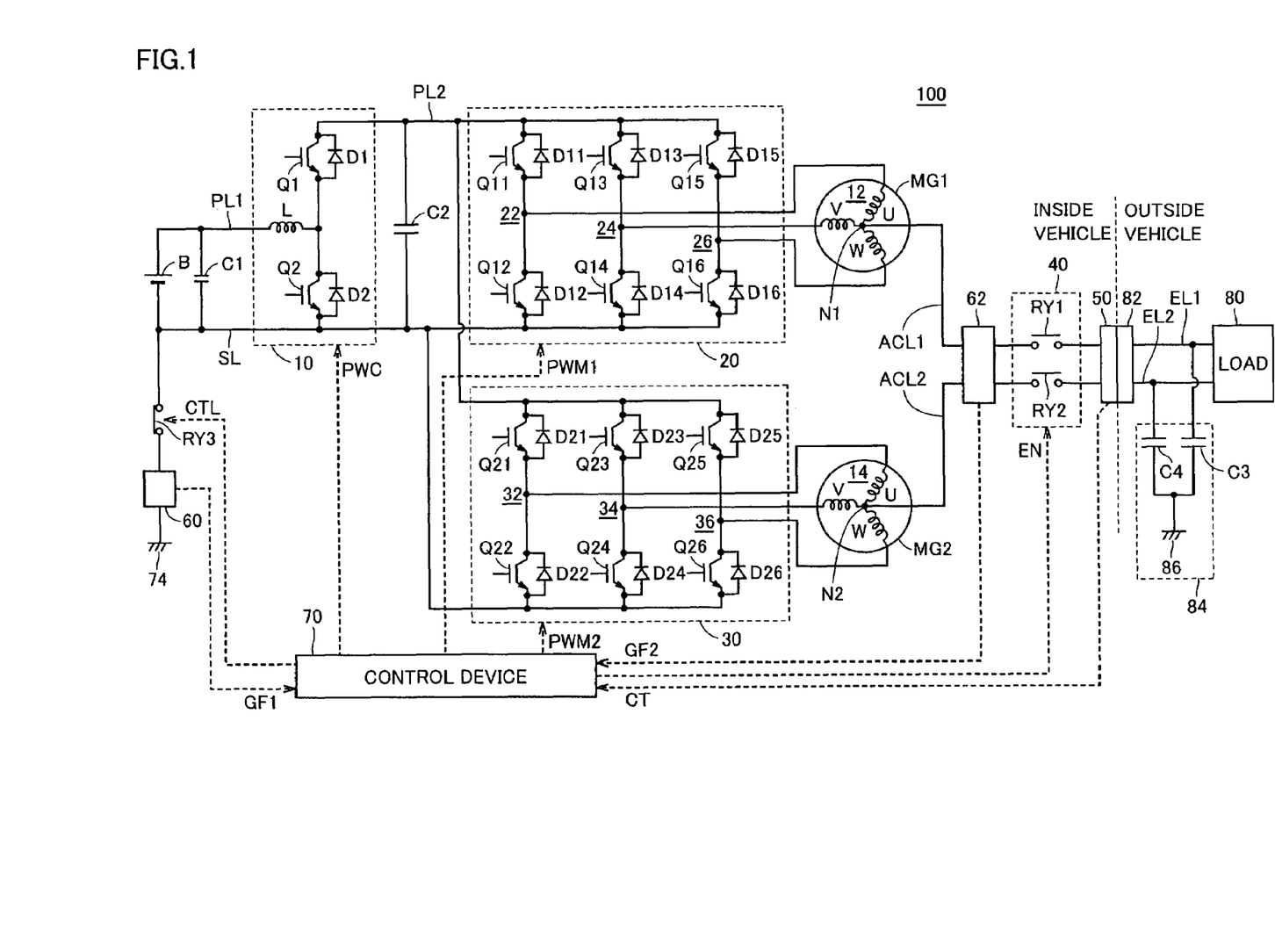
FIG. 1 is a general block diagram of an AC voltage output apparatus according to an embodiment of the present invention.

FIG. 1 is a general block diagram of an AC voltage output apparatus according to an embodiment of the present invention. Referring to FIG. 1, the AC voltage output apparatus 100 includes a battery B, an up-converter 10, inverters 20 and 30, motor generators MG1 and MG2, a relay circuit 40, a connector 50, leakage detecting devices 60 and 62, a relay RY3, a control device 70, capacitors C1 and C2, power supply lines PL1 and PL2, a ground line SL, and AC output lines ACL1 and ACL2.

AC voltage output apparatus 100 is incorporated into a hybrid vehicle. Motor generator MG1 is incorporated into the hybrid vehicle as one that operates as an electric motor that can start an engine (not shown) and operates as an electric generator driven by the engine. Motor generator MG2 is incorporated into the hybrid vehicle as one that operates as an electric motor driving the driving wheels of the hybrid vehicle (not shown).

A positive electrode of battery B is connected to power supply line PL1. A negative electrode of battery B is connected to ground line SL. Relay RY3 and leakage detecting device 60 are connected in series between ground line SL and a body ground 74 of the vehicle. Capacitor C1 is connected between power supply line PL1 and ground line SL.

Up-converter 10 includes a reactor L, power transistors Q1 and Q2, and diodes D1 and D2. Power transistors Q1 and Q2 are connected in series between power supply line PL2 and ground line SL. Diodes D1, D2 are connected across a collector and an emitter of power transistors Q1, Q2, respectively, so as to cause a current to flow from the emitter side to the collector side. Reactor L has one end connected to a connection node of power transistors Q1 and Q2 and the other end connected to power supply line PL1.

Capacitor C2 is connected between power supply line PL2 and ground line SL. Inverter 20 includes a U-phase arm 22, a V-phase arm 24 and a W-phase arm 26. U-phase arm 22, V-phase arm 24 and W-phase arm 26 are connected in parallel between power supply line PL2 and ground line SL. U-phase arm 22 is formed of power transistors Q11, Q12 connected in series, V-phase arm 24 is formed of power transistors Q13, Q14 connected in series, and W-phase arm 26 is formed of power transistors Q15, Q16 connected in series. Diodes D11-D16 are connected across a collector and an emitter of power transistors Q11-Q16, respectively, to cause a current to flow from the emitter side to the collector side.

Inverter 30 includes a U-phase arm 32, a V-phase arm 34 and a W-phase arm 36. U-phase arm 32, V-phase arm 34 and W-phase arm 36 are connected in parallel between power supply line PL2 and ground line SL. U-phase arm 32 is formed of power transistors Q21, Q22 connected in series, V-phase arm 34 is formed of power transistors Q23, Q24 connected in series, and W-phase arm 36 is formed of power transistors Q25, Q26 connected in series. Diodes D21-D26 are connected across a collector and an emitter of power transistors Q21-Q26, respectively, to cause a current to flow from the emitter side to the collector side.

Motor generator MG1 includes a Y-connected 3-phase coil 12 as a stator coil. Each of U-, V- and W-phase coils forming 3-phase coil 12 has one end connected to each other to form a neutral point N1, and the respective other ends of the U-, V- and W-phase coils are connected to connection nodes of the power transistors in the U-, V- and W-phase arms of inverter 20, respectively.

Motor generator MG2 includes a Y-connected 3-phase coil 14 as a stator coil. Each of U-, V- and W-phase coils forming 3-phase coil 14 has one end connected to each other to form a neutral point N2, and the respective other ends of the U-, V- and W-phase coils are connected to connection nodes of the power transistors in the U-, V- and W-phase arms of inverter 30, respectively.

Relay circuit 40 includes relays RY1 and RY2. Relay RY1 has one end connected via AC output line ACL1 to neutral point N1 of 3-phase coil 12 of motor generator MG1, and the other end connected to connector 50. Relay RY2 has one end connected via AC output line ACL2 to neutral point N2 of 3-phase coil 14 of motor generator MG2, and the other end connected to connector 50.

Leakage detecting device 62 is arranged on AC output lines ACL1 and ACL2. Specifically, leakage detecting device 62 is arranged to surround AC output lines ACL1 and ACL2 so as not to contact them. Connector 50 is connected to relays RY1 and RY2 of relay circuit 40.

A plug 82 of a load 80 provided outside the vehicle and receiving the supply of a commercial AC voltage output from AC voltage output apparatus 100 is then connected to connector 50. Load 80 outside the vehicle is, for example, a house load, and is connected via power supply lines EL1 and EL2 to plug 82.

A Y-capacitor 84 is connected to power supply lines EL1 and EL2. Y-capacitor 84 includes capacitors C3 and C4. Capacitor C3 is connected between power supply line EL1 and a ground 86. Capacitor C4 is connected between power supply line EL2 and ground 86. Y-capacitor 84 is provided as a filter for removing common mode noise on power supply lines EL1 and EL2.

Battery B, which is a DC power supply, is formed, e.g., of a nickel-hydrogen or lithium-ion secondary battery. Battery B generates a DC voltage to output it to up-converter 10, and is also charged by the DC voltage output from up-converter 10. Capacitor C1 smoothes voltage variation between power supply line PL1 and ground line SL.

Up-converter 10, based on a signal PWC from control device 70, uses reactor L to boost the DC voltage received from battery B and supplies the boosted voltage to power supply line PL2. Specifically, based on signal PWC from control device 70, up-converter 10 stores the flowing current according to the switching operation of power transistor Q2 as magnetic field energy at reactor L, to boost the DC voltage from battery B. Up-converter 10 then outputs the boosted voltage via diode D1 to power supply line PL2 in synchronization with the timing at which power transistor Q2 is turned off.

Capacitor C2 smoothes voltage variation between power supply line PL2 and ground line SL. Inverter 20, based on a signal PWM1 from control device 70, converts the DC voltage received from power supply line PL2 to a 3-phase AC voltage, and outputs the converted 3-phase AC voltage to motor generator MG1. Furthermore, inverter 20 converts the 3-phase AC voltage generated by motor generator MG1 in receipt of a power from the engine, to a DC voltage based on signal PWM1 from control device 70, and outputs the converted DC voltage to power supply line PL2.

Here, inverter 20 controls the potential at neutral point N1 based on signal PWM1 from control device 70, such that a commercial AC voltage Vac is generated across neutral points N1 and N2 of 3-phase coils 12 and 14 of motor generators MG1 and MG2, in a manner as will be described later.

Inverter 30, based on a signal PWM2 from control device 70, converts the DC voltage received from power supply line PL2 to a 3-phase AC voltage, and outputs the converted 3-phase AC voltage to motor generator MG2. In the regenerative braking operation of the vehicle, inverter 30 converts the 3-phase AC voltage generated by motor generator MG2 to a DC voltage based on signal PWM2 from control device 70, and outputs the converted DC voltage to power supply line PL2.

Here, inverter 30 controls the potential at neutral point N2 based on signal PWM2 from control device 70, such that a commercial AC voltage Vac is generated across neutral points N1 and N2 of 3-phase coils 12 and 14 of motor generators MG1 and MG2, in a manner as will be described later.

Motor generators MG1 and MG2 each are a 3-phase AC motor generator, which may be formed of a 3-phase AC synchronous motor generator, for example. Motor generator MG1 uses a power from the engine to generate a 3-phase AC voltage, and outputs the generated 3-phase AC voltage to inverter 20. Motor generator MG1 also generates driving force by the 3-phase AC voltage received from inverter 20, to start the engine. Motor generator MG2 generates driving torque of the vehicle by the AC voltage received from inverter 30. At the time of regenerative braking of the vehicle, motor generator MG2 generates and outputs a 3-phase AC voltage to inverter 30.

Relay circuit 40 connects/disconnects AC output lines ACL1, ACL2 to/from connector 50 in response to an AC output enable signal EN from control device 70. Specifically, upon receipt of AC output enable signal EN of an H (logic high) level from control device 70, relays RY1 and RY2 are turned on to electrically connect AC output lines ACL1 and ACL2 to connector 50. Upon receipt of AC output enable signal EN of an L (logic low) level from control device 70, relays RY1 and RY2 are turned off to electrically disconnect AC output lines ACL1 and ACL2 from connector 50.

Connector 50 is an output terminal for outputting commercial AC voltage Vac generated across neutral points N1 and N2 to load 80 outside the vehicle. A power supply plug for an electric appliance or for household backup power is connected to connector 50. When connector 50 is connected to plug 82 of load 80 outside the vehicle, it outputs a signal CT of an H level to control device 70.

Leakage detecting device 60 detects leakage from AC voltage output apparatus 100 to a vehicle body. Leakage detecting device 60 detects a leakage current flowing between body ground 74 and ground line SL. If the detected leakage current is above a predetermined threshold value, leakage detecting device 60 determines that leakage occurs, and outputs a signal GF1 of an H level to control device 70.

Relay RY3, which is a normally-closed relay, connects/disconnects ground line SL to/from leakage detecting device 60 (body ground 74) in response to a control signal CTL from control device 70. Specifically, relay RY3 is turned on by control signal CTL of an L level and is turned off by control signal CTL of an H level. Relay RY3 electrically connects leakage detecting device 60 (body ground 74) to ground line SL when it is turned on by control signal CTL of an L level. Relay RY3 electrically disconnects leakage detecting device 60 (body ground 74) from ground line SL when it is turned off by control signal CTL of an H level.

Leakage detecting device 62 detects whether leakage occurs or not when commercial AC voltage Vac generated across neutral points N1 and N2 is supplied to load 80 outside the vehicle. Leakage detecting device 62 includes, for example, a flux-collecting core (not shown) arranged to surround AC output lines ACL1 and ACL2, and a coil (not shown) wound around the flux-collecting core. If the voltage generated in the coil in accordance with the difference between the amounts of the alternating currents flowing on respective AC output lines ACL1 and ACL2 exceeds a predetermined threshold value, leakage detecting device 62 determines that leakage occurs, and outputs a signal GF2 of an H level to control device 70.

Control device 70 generates signal PWC for driving up-converter 10 based on a torque command value and the number of rotations of each of motor generators MG1, MG2, a voltage of battery B, and a voltage on power supply line PL2, and outputs the generated signal PWC to up-converter 10. The number of rotations of each of motor generators MG1, MG2, the voltage of battery B and the voltage on power supply line PL2 are detected by corresponding sensors (not shown).

Control device 70 generates signal PWM1 for driving motor generator MG1 based on the voltage on power supply line PL2 and phase currents and the torque command value of motor generator MG1, and outputs the generated signal PWM1 to inverter 20. Furthermore, control device 70 generates signal PWM2 for driving motor generator MG2 based on the voltage on power supply line PL2 and phase currents and the torque command value of motor generator MG2, and outputs the generated signal PWM2 to inverter 30. A current sensor (not shown) detects respective phase currents in motor generators MG1, MG2.

In addition, when an ignition key (or a start switch) is turned on in the case where signal CT is at an H level, control device 70 generates control signal CTL and AC output enable signal EN both of an H level, to output them to relay RY3 and relay circuit 40, respectively. Control device 70 then generates signals PWM1 and PWM2 such that commercial AC voltage Vac is generated across neutral points N1 of 3-phase coil 12 of motor generator MG1 and neutral point N2 of 3-phase coil 14 of motor generator MG2, and outputs the generated signals PWM1 and PWM2 to inverters 20 and 30, respectively.

Figure 2:
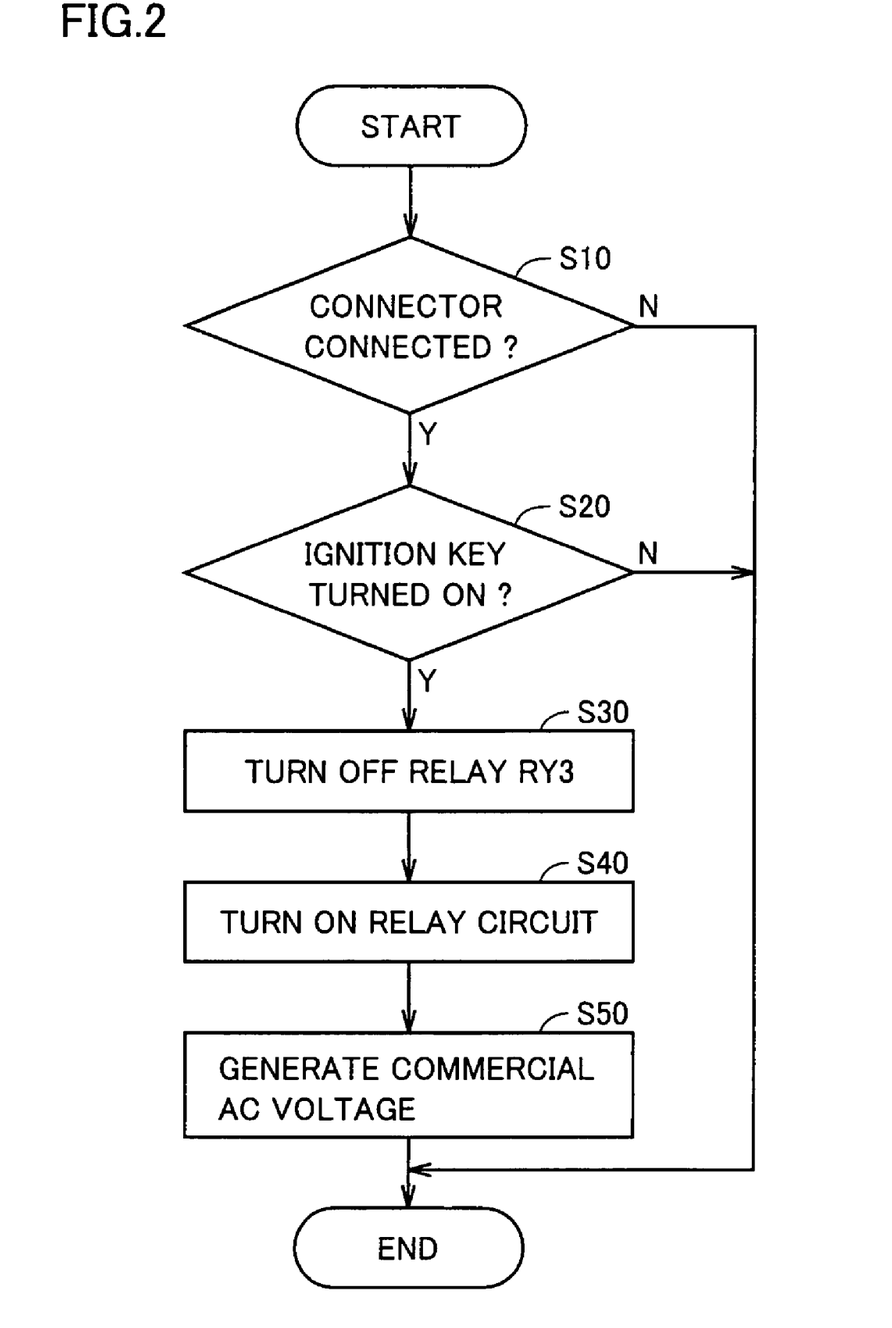
FIG. 2 is a flowchart of a process by a control device shown in FIG. 1, relating to the generation of a commercial AC voltage.

FIG. 2 is a flowchart of a process by control device 70 shown in FIG. 1, relating to the generation of commercial AC voltage Vac. Referring to FIG. 2, when a series of processes are started, control device 70 determines, based on signal CT from connector 50, whether or not plug 82 of load 80 outside the device is connected to connector 50 (step S1). When control device 70 determines that signal CT is at an L level and plug 82 is not connected to connector 50 (NO in step S10), it terminates the series of processes.

On the other hand, when control device 70 determines that signal CT is at an H level and plug 82 is connected to connector 50 (YES in step SI 0), it determines whether the ignition key is turned on or not (step S20). When control device 70 determines that the ignition key is turned off, it terminates the series of processes.

When control device 70 determines that the ignition key is turned on (YES in step S20), it generates control signal CTL of an H level to output it to relay RY3, and turns off relay RY3 (step S30). Furthermore, control device 70 generates AC output enable signal EN of an H level to output it to relay circuit 40, and turns on relays RY1 and RY2 of relay circuit 40 (step S40).

When relay RY3 is turned off and relay circuit 40 is turned on, control device 70 generates signals PWM1 and PWM2 such that commercial AC voltage Vac is generated across neutral points N1 and N2, and outputs the generated signals PWM1 and PWM2 to inverters 20 and 30, respectively. This causes commercial AC voltage Vac to be generated across neutral points N1 and N2 (step S50), and the series of processes are completed.

Figure 3:
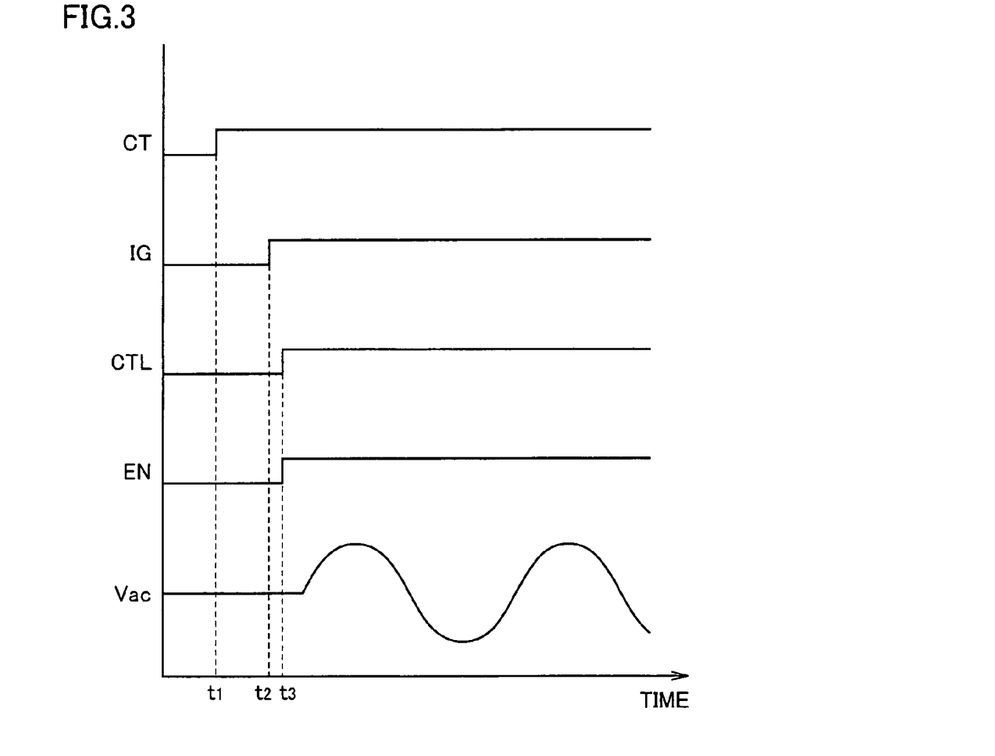
FIG. 3 is a timing chart of each signal at the time of starting to output the commercial AC voltage.

FIG. 3 is a timing chart of each signal at the time of starting to output commercial AC voltage Vac. Referring to FIG. 3, at a timing t1, plug 82 of load 80 outside the vehicle is connected to connector 50, and signal CT becomes an H level.

When the ignition key (IG) is turned on at a timing t2, control signal CTL and AC output enable signal EN both become an H level at a timing t3. As control signal CTL and AC output enable signal EN become an H level, commercial AC voltage Vac is generated across neutral points N1 and N2.

Figure 4:
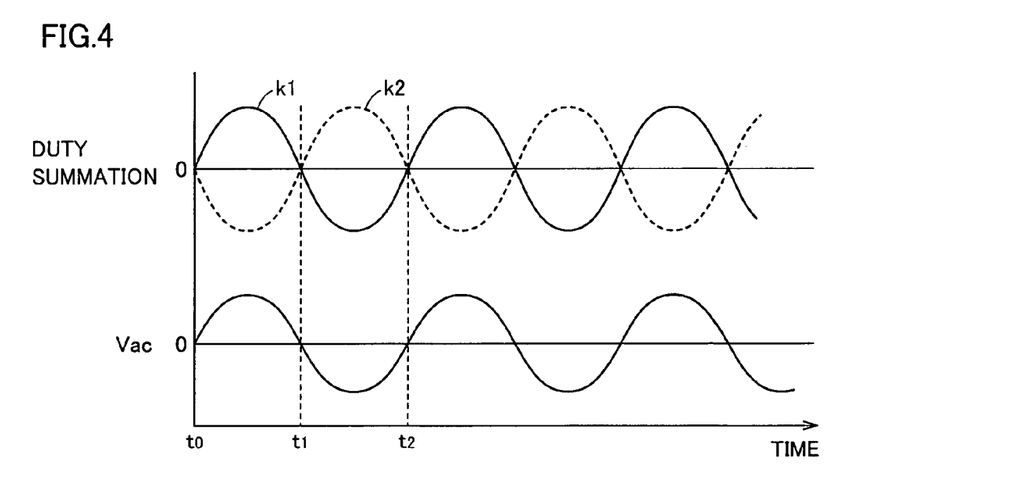
FIG. 4 shows waveforms of duty summation of an inverter and the commercial AC voltage generated across neutral points.

FIG. 4 shows waveforms of duty summation of inverters 20 and 30, and commercial AC voltage Vac generated across neutral points N1 and N2. Referring to FIG. 4, a curve k1 represents the change in duty summation during switching control of inverter 20, and a curve k2 represents the change in duty summation during switching control of inverter 30. Here, the duty summation refers to a result of subtraction of on-duty of the lower arm from on-duty of the upper arm in each inverter. In FIG. 4, when the duty summation takes a positive value, it indicates that a potential at the neutral point of the corresponding motor generator is higher than the intermediate value (Vdc/2) of an inverter input voltage (the voltage on power supply line PL2 shown in FIG. 1, and hereinafter referred to as "Vdc"). When the duty summation takes a negative value, it indicates that the potential at the neutral point is lower than potential Vdc/2.

In AC voltage output apparatus 100, control device 70 periodically alters the duty summation of inverter 20 at a commercial frequency according to curve k1, and periodically alters the duty summation of inverter 30 at the commercial frequency according to curve k2. Here, the duty summation of inverter 30 is altered periodically in a phase that is an inverted version of the phase in which the duty summation of inverter 20 is altered.

As a result, during the time period from t0 to t1, the potential at neutral point N1 becomes higher than potential Vdc/2, and the potential at neutral point N2 becomes lower than potential Vdc/2, so that a positive commercial AC voltage Vac is generated across neutral points N1 and N2. Here, when plug 82 of load 80 outside the vehicle is connected to connector 50, the excess current that could not flow from the upper arm to the lower arm in inverter 20 flows from neutral point N1 via AC output line ACL1, load 80 outside the vehicle and AC output line ACL2 to neutral point N2, and then it flows from neutral point N2 to the lower arm of inverter 30.

During the time period from t1 to t2, the potential at neutral point N1 is lower than potential Vdc/2, and the potential at neutral point N2 is higher than potential Vdc/2. Thus, a negative commercial AC voltage Vac is generated across neutral points N1 and N2. The excess current that could not flow from the upper arm to the lower arm in inverter 30 flows from neutral point N2 via AC output line ACL2, load 80 outside the vehicle and AC output line ACL1 to neutral point N1, and then it flows from neutral point N1 to the lower arm of inverter 20.

In this manner, in AC voltage output apparatus 100, an AC voltage is generated across neutral points N1 and N2. It is possible to generate commercial AC voltage Vac across neutral points N1 and N2 by controlling the amplitudes of curves k1 and k2.

Furthermore, in AC voltage output apparatus 100, it is possible to generate commercial AC voltage Vac across neutral points N1 and N2 while driving motor generators MG1 and MG2. Thus, commercial AC voltage Vac can be supplied to load 80 outside the vehicle while driving motor generator MG1 coupled to the engine in a regenerative mode (generating electricity) and controlling motor generator MG2 coupled to a drive shaft of the vehicle to generate a reaction force (driving in a power running mode).

Referring again to FIG. 1, an overall operation of AC voltage output apparatus 100 will be described. When plug 82 of load 80 outside the vehicle is connected to connector 50, connector 50 outputs signal CT of an H level to control device 70. Control device 70 then outputs control signal CTL of an H level to relay RY3 to turn off relay RY3, which is a normally-closed relay. This prevents the generation of a leakage current that may flow from power supply lines EL1, EL2 outside the vehicle via Y-capacitor 84, ground 86, body ground 74 and leakage detecting device 60 to ground line SL inside the vehicle when commercial AC voltage Vac is supplied from AC voltage output apparatus 100 to load 80 outside the vehicle.

Control device 70 outputs AC output enable signal EN of an H level to relay circuit 40. This causes AC voltage output circuit 100 to be electrically connected via connector 50 and plug 82 to load 80 outside the vehicle. Inverters 20 and 30 then generate commercial AC voltage Vac across neutral points N1 and N2, based on signals PWM1 and PWM2 from control device 70, in accordance with the above-described method. Thus, commercial AC voltage Vac generated across neutral points N1 and N2 is supplied via AC output lines ACL1 and ACL2, connector 50, plug 82 and power supply lines EL1 and EL2 to load 80 outside the vehicle.

When commercial AC voltage Vac is being output, leakage detecting device 60 cannot function. However, while commercial AC voltage Vac is being output, leakage detecting device 62 provided on AC output lines ACL1 and ACL2 detects the presence/absence of leakage.

On the other hand, if plug 82 of load 80 outside the vehicle is not connected to connector 50, control device 70 outputs control signal CTL of an L level to relay RY3 that is a normally-closed relay, to turn on relay RY3. This causes leakage detecting device 60 to be electrically connected to ground line SL, thereby enabling the intended function of detecting leakage to be implemented.

As described above, according to the present embodiment, it is possible to prevent a leakage current from flowing via the ground when commercial AC voltage Vac is being output from AC voltage output apparatus 100 to load 80 outside the vehicle, since relay RY3 is turned off during the time.

In addition, although leakage detecting device 60 cannot function while commercial AC voltage Vac is output from AC voltage output apparatus 100 to load 80 outside the vehicle, leakage detecting device 62 detects leakage, so that it is possible to ensure a function of detecting leakage even at the time of supplying commercial AC voltage Vac.

Furthermore, since commercial AC voltage Vac is generated across neutral point N1 of 3-phase coil 12 of motor generator MG1 and neutral point N2 of 3-phase coil 14 of motor generator MG2, to supply the same to load 80 outside the vehicle, an inverter dedicated to generating commercial AC voltage Vac is unnecessary.

Although, it has been configured in the above-described embodiment such that commercial AC voltage Vac is generated across neutral points N1 and N2 of motor generators MG1 and MG2 in a hybrid vehicle to which two motor generators MG1 and MG2 are mounted, the present invention is also applicable to a system provided with an inverter dedicated to generating commercial AC voltage Vac.

Although battery B is a secondary battery in the above description, it may be a fuel cell instead. Although AC voltage output apparatus 100 is mounted to a hybrid vehicle in the above description, the scope of application of the present invention is not limited to the AC voltage output apparatus mounted to the hybrid vehicle, and may include those mounted to an electric vehicle and a fuel cell vehicle.

Although relay RY3 is connected between ground line SL and leakage detecting device 60 in the above description, it may be connected between leakage detecting device 60 and body ground 74.

Although AC voltage output apparatus 100 is provided with up-converter 10 in the above description, the present invention is also applicable to a system not provided with up-converter 10.

Finally, in the above description, battery B, up-converter 10, inverters 20 and 30, motor generators MG1 and MG2, and control device 70 form the "voltage generating device" of the present invention. Further, leakage detecting device 60 corresponds to the "first leakage detecting device" of the present invention, and relay RY3 corresponds to the "cutoff device" and the "relay" of the present invention. Load 80 outside the vehicle corresponds to the "load" of the present invention, and Y-capacitor 84 corresponds to the "line-bypass capacitor" of the present invention. Leakage detecting device 62 corresponds to the "second leakage detecting device" of the present invention. Motor generators MG1 and MG2 correspond to the "first AC electric motor" and the "second AC electric motor," respectively, of the present invention. Inverters 20 and 30 correspond to the "first inverter" and the "second inverter," respectively, of the present invention. Control device 70 corresponds to the "inverter control unit" of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An alternating-current (AC) voltage output apparatus mounted to a vehicle and generating and supplying a commercial AC voltage to a load outside the vehicle, comprising:
   a voltage generating device generating said commercial AC voltage;
   a first leakage detecting device arranged between said voltage generating device and a vehicle ground; and
   a cutoff device cutting off an electric path formed between said vehicle ground and said voltage generating device via said first leakage detecting device when said load is connected to said voltage generating device.

2. The AC voltage output apparatus according to claim 1, wherein said load includes a line-bypass capacitor connected between a ground and a power line pair receiving the supply of said commercial AC voltage.

3. The AC voltage output apparatus according to claim 1, wherein
   said voltage generating device includes a direct-current (DC) power supply,
   said cutoff device includes a relay connected in series with said first leakage detecting device between a negative electrode of said DC power supply and said vehicle ground, and
   said relay is turned off when said load is connected to said voltage generating device.

4. The AC voltage output apparatus according to claim 1, further comprising a second leakage detecting device detecting whether there is leakage or not, based on an alternating current flowing through an output line pair for outputting said commercial AC voltage generated by said voltage generating device to said load.

5. The AC voltage output apparatus according to claim 1, wherein said voltage generating device includes
   first and second AC electric motors having first and second 3-phase coils as a stator coil, respectively,
   first and second inverters connected to said first and second 3-phase coils, respectively, and
   an inverter control unit controlling said first and second inverters,
   wherein said first and second inverters generate said commercial AC voltage across neutral points of said first and second 3-phase coils in response to a control signal from said inverter control unit.

6. An AC voltage output apparatus mounted to a vehicle and generating and supplying a commercial AC voltage to a load outside the vehicle, comprising:
   voltage generating means for generating said commercial AC voltage;
   first leakage detecting means arranged between said voltage generating means and a vehicle ground; and
   cutoff means for cutting off an electric path formed between said vehicle ground and said voltage generating means via said first leakage detecting means when said load is connected to said voltage generating means.

7. The AC voltage output apparatus according to claim 6, wherein said load includes a line-bypass capacitor connected between a ground and a power line pair receiving the supply of said commercial AC voltage.

8. The AC voltage output apparatus according to claim 6, wherein said voltage generating means includes a DC power supply, said cutoff means includes a relay connected in series with said first leakage detecting means between a negative electrode of said DC power supply and said vehicle ground, and said relay is turned off when said load is connected to said voltage generating means.

9. The AC voltage output apparatus according to claim 6, further comprising second leakage detecting means for detecting whether there is leakage or not, based on an alternating current flowing through an output line pair for outputting said commercial AC voltage generated by said voltage generating means to said load.

10. The AC voltage output apparatus according to claim 6, wherein said voltage generating means includes first and second AC electric motors having first and second 3-phase coils as a stator coil, respectively, first and second inverters connected to said first and second 3-phase coils, respectively, and inverter control means for controlling said first and second inverters, wherein said first and second inverters generate said commercial AC voltage across neutral points of said first and second 3-phase coils in response to a control signal from said inverter control means.

* * * * *